United States Patent
Takaki

(10) Patent No.: US 10,049,060 B2
(45) Date of Patent: Aug. 14, 2018

(54) SEMICONDUCTOR DEVICE AND CONTROL METHOD OF THE SAME

(71) Applicant: KABUSHIKI KAISHA TOSHIBA, Tokyo (JP)

(72) Inventor: Shigeaki Takaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 15/253,796

(22) Filed: Aug. 31, 2016

(65) Prior Publication Data

US 2017/0262393 A1    Sep. 14, 2017

(30) Foreign Application Priority Data

Mar. 11, 2016    (JP) .................................. 2016-048702

(51) Int. Cl.
*G06F 1/24*    (2006.01)
*G06F 13/24*    (2006.01)
(Continued)

(52) U.S. Cl.
CPC ................ *G06F 13/24* (2013.01); *G06F 1/14* (2013.01); *G06F 1/3287* (2013.01)

(58) Field of Classification Search
CPC .......... G06F 3/1221; G06F 13/24; G06F 1/14; G06F 1/3287
(Continued)

(56) References Cited

U.S. PATENT DOCUMENTS 5,231,872 A * 8/1993 Bowler ................. B60C 23/007
                                                      340/445
5,925,133 A    7/1999 Buxton et al.
(Continued)

FOREIGN PATENT DOCUMENTS

JP    H0588797 A    4/1993
JP    H08263466 A    10/1996
(Continued)

OTHER PUBLICATIONS

Japanese Office Action dated Apr. 27, 2018, filed in Japanese counterpart Application No. 2016-048702, 7 pages (with translation).

*Primary Examiner* — Christopher Shin
(74) *Attorney, Agent, or Firm* — Patterson & Sheridan, LLP

(57) ABSTRACT

A semiconductor device includes a processor for running a real-time operating system (RTOS). The RTOS causes the processor to update internal time during a first mode and to stop updating in a second mode. A first counter periodically transmits an interrupt signal to the processor that is coordinated with a periodic counting sequence. A second counter counts while the semiconductor device is in the second mode. A first circuit reads a first count value from the first counter at a starting time of a transition from the first to the second mode, masks the interrupt signal, and causes the second counter to start counting. A second circuit unmasks the interrupt signal from the first counter after a starting time of a transition from the second to the first mode and reads a second count value from the second counter.

20 Claims, 5 Drawing Sheets

(51) Int. Cl.
*G06F 1/32* (2006.01)
*G06F 1/14* (2006.01)

(58) Field of Classification Search
USPC .......................................................... 713/320
See application file for complete search history.

(56) References Cited

U.S. PATENT DOCUMENTS

| | | | | |
|---|---|---|---|---|
| 5,926,640 | A * | 7/1999 | Mason | G06F 1/3228 |
| | | | | 326/98 |
| 6,006,335 | A * | 12/1999 | Choi | G06F 1/3203 |
| | | | | 713/310 |
| 6,237,420 | B1 * | 5/2001 | Rowlette | G05B 9/02 |
| | | | | 73/714 |
| 8,458,508 | B2 | 6/2013 | Misaka et al. | |
| 9,904,342 | B2 * | 2/2018 | Iguchi | G06F 1/266 |
| 2002/0149353 | A1 * | 10/2002 | Inaba | G06F 1/24 |
| | | | | 323/283 |
| 2006/0156047 | A1 * | 7/2006 | Ito | G06F 1/3203 |
| | | | | 713/310 |
| 2011/0173466 | A1 * | 7/2011 | Tanaka | G06F 1/3228 |
| | | | | 713/310 |
| 2013/0159747 | A1 * | 6/2013 | Hughes | G06F 1/3237 |
| | | | | 713/322 |
| 2016/0134500 | A1 * | 5/2016 | Chen | H04L 43/0817 |
| | | | | 370/252 |

FOREIGN PATENT DOCUMENTS

| | | |
|---|---|---|
| JP | 2806080 B2 | 9/1998 |
| JP | 2001282398 A | 10/2001 |
| JP | 2004151801 A | 5/2004 |
| JP | 2008221795 A | 9/2008 |
| JP | 4798445 B2 | 10/2011 |
| JP | 2011238152 A | 11/2011 |
| JP | 2015035112 A | 2/2015 |

* cited by examiner

SEMICONDUCTOR DEVICE AND CONTROL METHOD OF THE SAME

CROSS-REFERENCE TO RELATED APPLICATION

This application is based upon and claims the benefit of priority from Japanese Patent Application No. 2016-048702, filed Mar. 11, 2016, the entire contents of which are incorporated herein by reference.

FIELD

Embodiments described herein relate generally to a semiconductor device and a control method of the same.

BACKGROUND

As an OS (operating system) of a semiconductor device, an RTOS (real time operating system) is known. RTOS is widely used in embedded systems.

DETAILED DESCRIPTION

In general, according to one embodiment, a semiconductor device has a first operation mode and a second operation mode in which power consumption is less than that in the first operation mode. The semiconductor device includes a processor, e.g., a CPU (central processing unit), running an RTOS (real time operating system), the RTOS causing the processor to update an internal time in the first operation mode and to stop the updating the internal time in the second operation mode, a first counter configured to repeat a periodic counting sequence and periodically transmit an interrupt signal to the processor, the interrupt signal being coordinated with the periodic counting sequence, a second counter configured to count while the semiconductor device is in the second operation mode, a first circuit configured to read a first count value from the first counter at a start of a transition from the first operation mode to the second operation mode, to mask of the interrupt signal to the processor after the starting time of the transition from the first operation mode to the second operation mode, and to cause the second counter to start counting, and a second circuit configured to unmask the interrupt signal from the first counter after a starting time of a transition from the second operation mode to the first operation mode and to read a second count value counted by the second counter.

Hereinafter, example embodiments will be described with reference to the drawings. In the following description, components common to all the drawings will be given the same symbols.

1. First Embodiment

A semiconductor device and a control method thereof according to a first embodiment will be described. In the following, the description will be made about an example in which the semiconductor device is an MCU (micro controller unit) compatible with the RIOS (real time operating system).

1.1 Configuration of Semiconductor Device

First, a configuration of the semiconductor device will be described.

Figure 1:
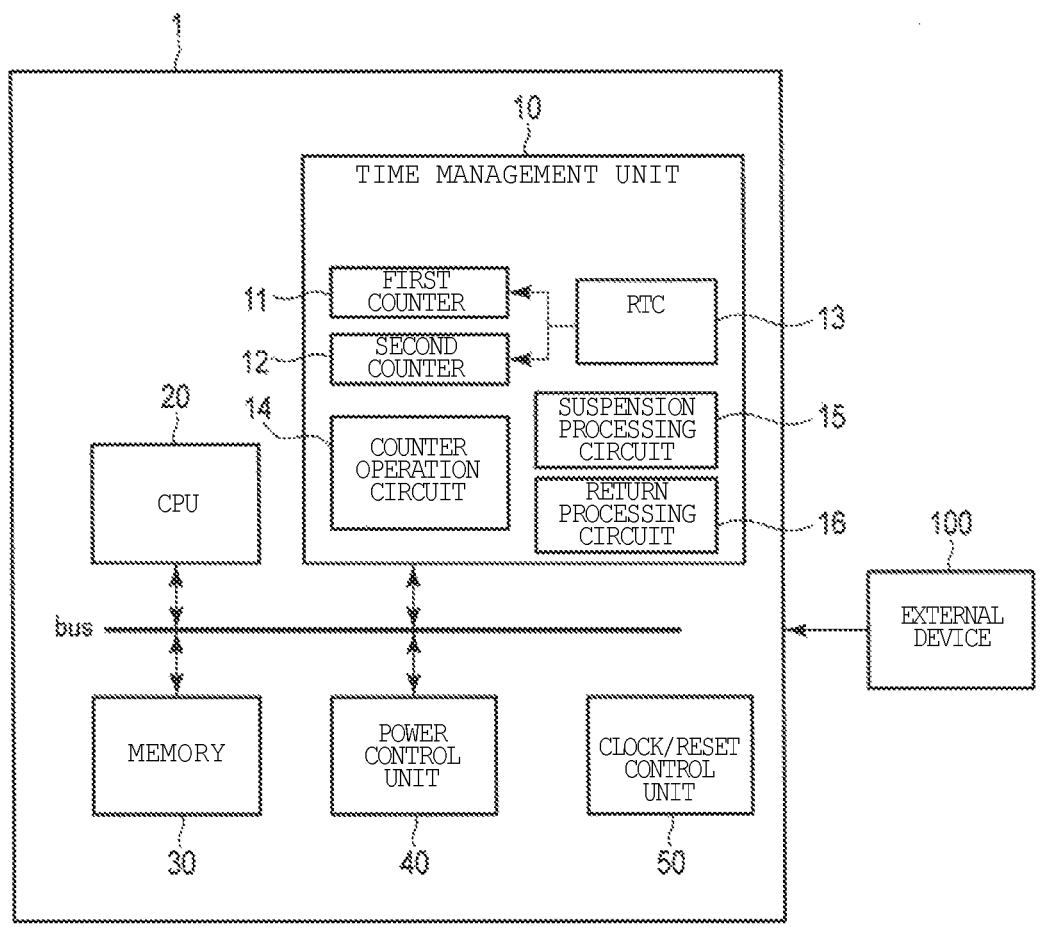
FIG. 1 is a block diagram of a semiconductor device according to a first embodiment.

FIG. 1 is a block diagram of the semiconductor device according to this first embodiment.

As illustrated in FIG. 1, an MCU 1 is connected to an external device 100, and performs various processes (tasks) in response to a command or commands from the external device 100. Here, the MCU 1 has a function of stopping power supply to some of the components in the MCU 1 not being used for any task, so as to transition to a low power consumption state. Hereinafter, a state where the MCU 1 is actively performing a task (or tasks) is referred to as a "normal mode", and the low power consumption state in which MCU 1 (or components thereof) is not being currently used for a task is referred to as a "low power mode". In the low power mode, power might not be supplied to CPU 20, for example.

The MCU 1 is provided with a time management unit 10, the CPU (central processing unit) 20, a memory 30, a power control unit 40, and a clock/reset control unit 50, and these components are connected to one another through an internal bus ("bus").

The time management unit 10 controls an operation of a counter which is necessary for the time management inside the MCU 1. For example, the time management unit 10 performs timing management of a "tick." The tick is a timing interrupt process performed at a constant period in the RTOS. The RTOS performs some controls in synchronization with the tick, such as updating of an internal time of the RTOS, scheduling a task to run, and time-out detection, for example. The time management unit 10 performs a timer interrupt operation on the CPU 20 (that is, the RTOS) in synchronization with the ticks. The time management unit 10 can continue its processes without suspension even when the MCU 1 is in the low power mode.

The time management unit 10 includes a first counter 11, a second counter 12, an RTC 13, a counter operation circuit 14, a suspension processing circuit 15, and a return processing circuit 16.

The first counter 11 is a synchronization counter which is synchronized with the period of the tick, and thus repeatedly counts with a constant period (a period interval of the tick). Therefore, the first counter 11 has a resolution equal to or greater than one period of the tick. In addition, the first counter 11 has a function of generating a timer interrupt signal (hereinafter, referred to as "tick interrupt signal") for the RTOS using a predetermined count value.

The second counter 12 starts or stops counting under the control of the counter operation circuit 14, the suspension processing circuit 15, or the return processing circuit 16. For example, the second counter 12 serves as an interval counter which counts an elapsed time in synchronization with the tick period when the CPU 20 is in the low power mode. Therefore, the second counter 12 has a resolution equal to or greater than the period of the tick, similar to the first counter. In the following, the description will be made about a case where the first counter 11 and the second counter 12 have the same resolution. However, the resolution of the first counter 11 may also be different from that of the second counter 12.

The RTC (real time counter) 13 transmits a clock signal necessary for the first counter 11 and the second counter 12. The RTC 13 includes an external interface (not specifically illustrated), and can thus operates in accordance with a clock signal input from a crystal oscillator provided on the outside of the time management unit 10 for example. Furthermore, the RTC 13 can also have an oscillator function based on a non-crystal oscillator disposed therein, and operate in accordance therewith instead of or in addition to an externally supplied clock signal.

The counter operation circuit 14 performs control on the first counter 11 and the second counter 12 to set a count value, to start or stop counting, and to mask or unmask the interrupt signal.

The suspension processing circuit 15 performs a process (hereinafter, referred to as a "suspension process") which is necessary when the MCU 1 transitions from the normal mode to the low power mode in response to a request from the CPU 20. More specifically, when receiving a signal (hereinafter, referred to as "suspension signal") to transition to the low power mode from the CPU 20, the suspension processing circuit 15 performs a process of reading the count value of the first counter 11 and transmitting the count value to the CPU 20, a process of masking the tick interrupt signal from the first counter 11, and a process of starting the counting of the second counter 12.

The return processing circuit 16 performs a process (hereinafter, referred to as "return process") which is necessary when the MCU 1 returns from the low power mode to the normal mode in response to a request from the CPU 20. More specifically, when receiving a signal (hereinafter, referred to as "return signal") to return to the normal mode from the CPU 20, for example, the return processing circuit 16 performs a process of unmasking the tick interrupt signal of the first counter 11, and a process of reading the count value of the second counter 12, and transmitting the count value to the CPU 20.

The CPU 20 serves to perform various device or component controls in the MCU 1 in response to a command from the external device 100. The CPU 20 activates the RTOS, for example. In the CPU 20, scheduling of the tasks and management of the internal time are performed by the RTOS. The RTOS updates the internal time by counting the tick interrupt signal transmitted from the time management unit 10. The CPU 20 (that is, the RTOS) causes the MCU 1 to transition to the low power mode when such is not used by any task after a predetermined period of time for example. The CPU 20 enters a suspension state in the low power mode. In other words, the CPU 20 enters a state where the power supply is blocked or cut off, or a state where only minimum power necessary for retaining the data of internal registers is supplied. Since the tick interrupt signal cannot be counted by the CPU 20 in the suspension state, the RTOS necessarily stops updating the internal time.

The memory 30 is, for example, an SRAM or a semiconductor memory such as eDRAM, and can be used as a work area of the CPU 20. In addition, the memory 30 may retain management tables for various tasks, programs, or the like.

The power control unit 40 generates a voltage necessary for operation of the MCU 1, and supplies this voltage to the respective circuits. The power control unit 40 has a function of transitioning to the low power mode and a function of returning to the normal mode by stopping or restarting the power supply to some of the components in the MCU 1. More specifically, when receiving the suspension signal from the CPU 20 for example, the power control unit 40 stops the power supply to the CPU 20, the memory 30, and the clock/reset control unit 50, and causes these components to transition to the low power mode. In addition, when receiving a signal from the external device 100 or a signal from the time management unit 10 for example, the power control unit 40 restarts the power supply to the CPU 20 and the memory 30, and causes these components to return to the normal mode.

The clock/reset control unit 50 performs the supply of the clock signal or a reset control to the CPU 20 and the other peripheral components in accordance with an instruction from the external device 100 for example.

1.2 Suspension Process and Return Process

Next, the operational flow of a suspension process and a return process will be described.

Figure 2:
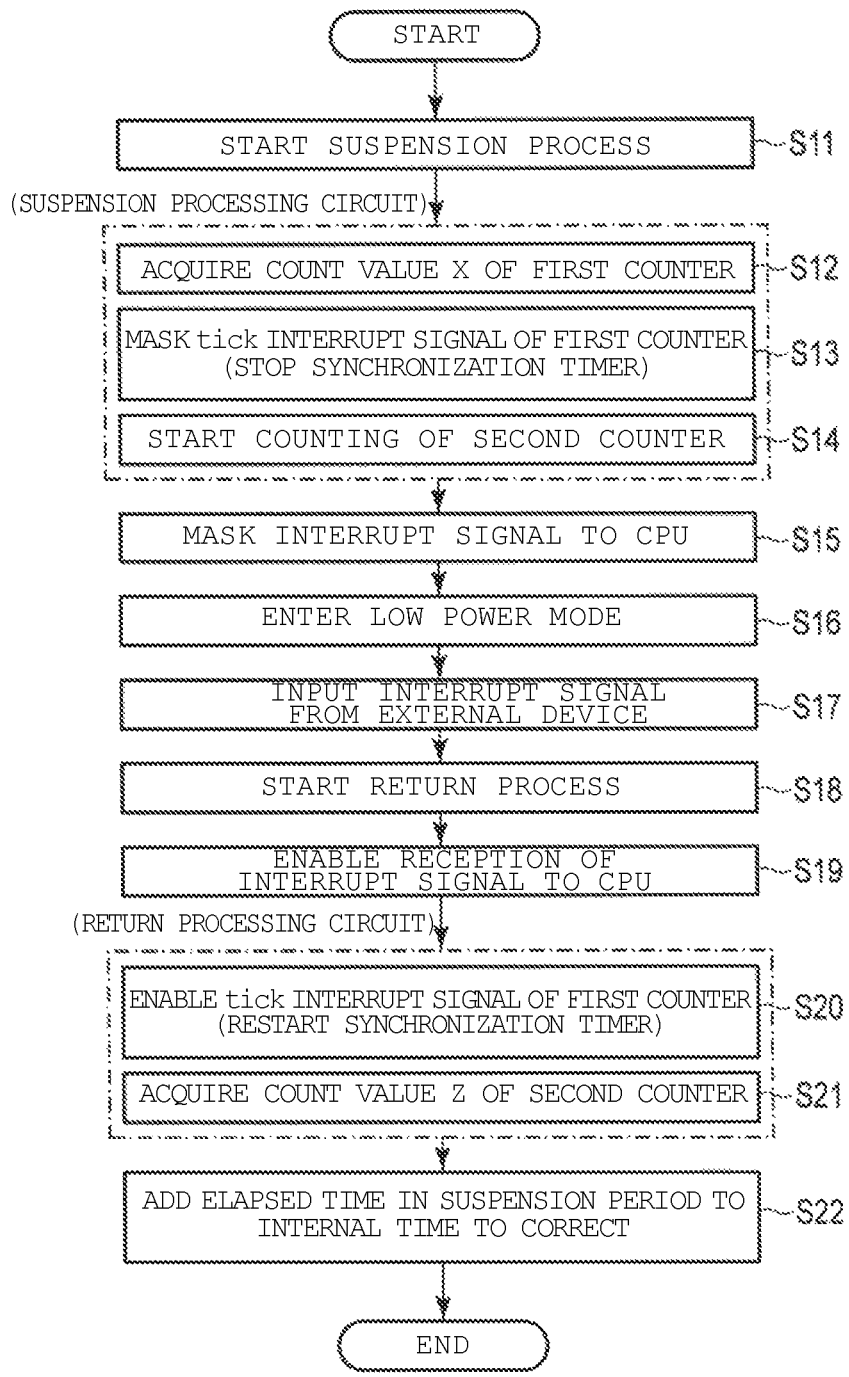
FIG. 2 is a flowchart of the semiconductor device according to the first embodiment.

FIG. 2 is a flowchart of the semiconductor device according to this embodiment.

As illustrated in FIG. 2, first the CPU 20 (that is, the RIOS running on the CPU 20) selects to transition to the low power mode when not being used by any task during some predetermined period of time, and thus starts the suspension process (Step S11). Specifically, here the CPU 20 transmits the suspension signal to the time management unit 10.

Next, the time management unit 10 starts the processes in Steps S12 to S14 upon receiving the suspension signal. In the following, the description will be made about a case where the time management unit 10 starts the operations in Steps S12 to S14 almost at the same time, and ends the operations when the count value of the first counter 11 is changed to the next value (next counter increment value). Further, a timing "almost at the same time" in this embodiment means a timing at which the count value of the first counter 11 is at the same value, for example.

Specifically, the suspension processing circuit 15 takes in a count value X of the first counter 11 when the suspension signal is received, and transmits the count value X to the CPU 20 (Step S12). The CPU 20 stores the received count value X in an internal register of the CPU 20 or the memory 30, for example. Furthermore, the suspension processing circuit 15 need not necessarily transmit the count value X to the CPU 20 but may instead store the count value X in the internal register of the suspension processing circuit 15 itself, and may therefore transmit the count value X to the CPU 20 at the time of the return process.

In addition, the suspension processing circuit 15 masks the tick interrupt signal to the CPU 20 in the first counter 11 (Step S13). Since the RIOS cannot receive the tick interrupt signal from the first counter 11, the RIOS stops updating its internal time. Hereinafter, a period during which the tick interrupt signal is masked is referred to as a "tick-less period". The first counter 11 stops functioning as a synchronization timer and stops outputting tick interrupt signal to the CPU 20, but the counting in the first counter 11 may otherwise continue even in the tick-less period.

In addition, the suspension processing circuit 15 causes the second counter 12 to start counting in synchronization with the first counter 11 (Step S14).

Next, the CPU 20 masks the reception of the interrupt signal from the external device 100 or the time management unit 10 after receiving the count value X (Step S15). Further, the suspension processing circuit 15 may transmit a signal for the CPU 20 to mask the reception of the interrupt signal independent of the count value X transmission.

Next, the power control unit 40 stops the power supply to the CPU 20, the memory 30, and the clock/reset control unit 50 in response to an instruction from the CPU 20. In place of completely stopping the power supply, the power control unit 40 may supply, for example, a minimum voltage that is lower than that supplied in the normal mode and may be for example, the minimum voltage necessary for retaining the data in the other components. Therefore, the MCU 1 enters the low power mode (Step S16). Meanwhile, the first counter 11 and the second counter 12 keep on counting.

Next, when the interrupt signal (that is, such as a command, an address, and a data signal for executing the task) is input from the external device 100 to the MCU 1 (Step S17), the MCU 1 starts the return process from the low power mode to the normal mode (Step S18). More specifically, when receiving the interrupt signal from the external device 100, the power control unit 40 restarts the power supply to the CPU 20, the memory 30, and the clock/reset control unit 50.

Next, when the power supply is restarted and the CPU 20 is activated, the CPU 20 unmasks the interrupt signal, and thus enables the reception of the interrupt signal from the external device 100 or the time management unit 10 (Step S19).

Next, when receiving the return signal from the CPU 20, the time management unit 10 starts the processes in Steps S20 and S21. In the following, the description will be made about a case where the time management unit 10 starts the operations in Steps S20 and S21 almost at the same time (in a single tick period), and ends the operations when the count value of the first counter 11 is changed to the next value.

Specifically, the return processing circuit 16 unmasks the tick interrupt signal from the first counter 11 after the reception of the interrupt signal is enabled in the CPU 20 (Step S20). The first counter 11 thus restarts the transmission of the tick interrupt signal to the CPU 20, and restarts its functioning as a synchronization timer. The RTOS restarts counting of the tick interrupt signals.

In addition, the return processing circuit 16 takes in a count value Z of the second counter 12, and transmits this count value Z to the CPU 20 (Step S21).

Next, when the CPU 20 receives the count value Z, the RTOS calculates an elapsed time period (hereinafter, referred to as "low power period"), corresponding to how long the CPU 20 was in the low power mode, using the count values X and Z, and adds the calculated elapsed time to the internal time (Step 22). Therefore, the RTOS corrects a deviation between the internal time and the real time.

1.3 Correction of Internal Time

Next, the correction process of the internal time will be described.

Figure 3:
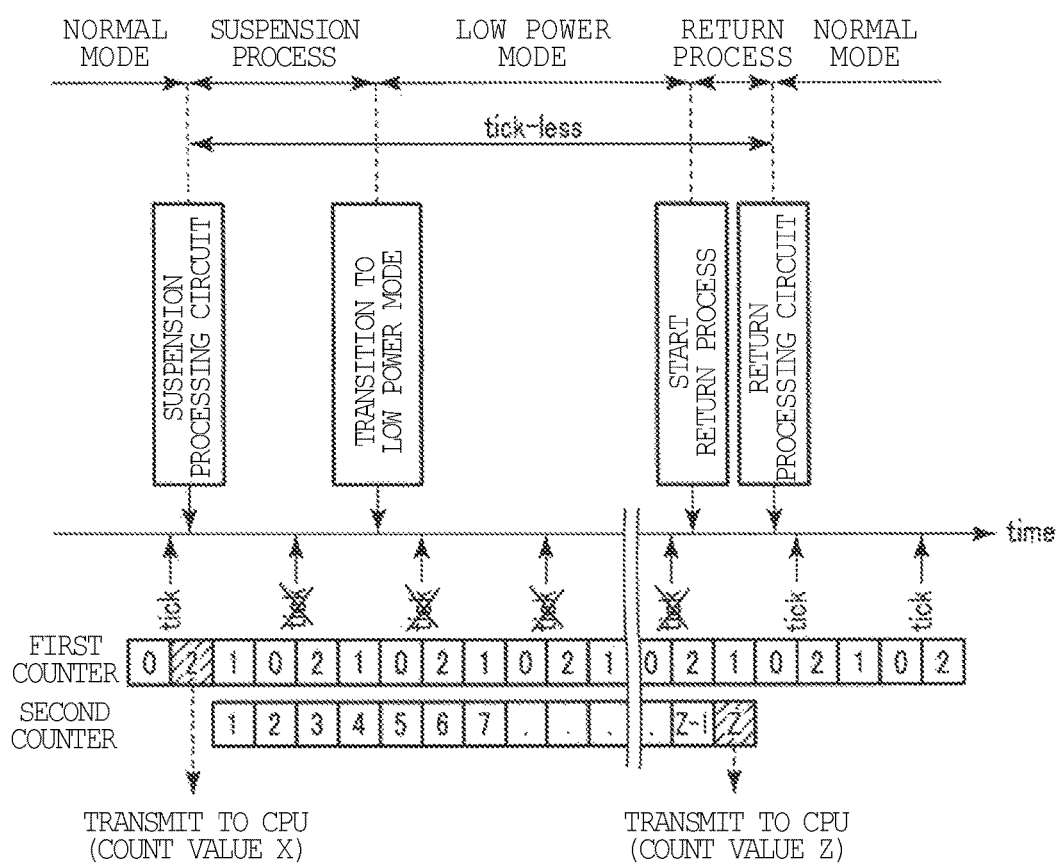
FIG. 3 is a timing chart of operations of the semiconductor device according to the first embodiment.

FIG. 3 is a timing chart of the semiconductor device according to this embodiment.

In the example of FIG. 3, a resolution of the count value of the first counter 11 is set to "3", and the first counter 11 repeatedly counts down 2, 1, 0, 2, 1, 0, and so on. In addition, the first counter 11 transmits the tick interrupt signal to the CPU 20 at the timing when the count value is changed from "0" to "2". The resolution of the first counter 11 and the timing for transmitting the tick interrupt signal can be arbitrarily set.

Furthermore, the example of FIG. 3 shows a case where the suspension processing circuit 15 starts the suspension process when the count value of the first counter 11 is "2". Further, the suspension processing circuit 15 may start the suspension process at any count value of the first counter 11.

As illustrated in FIG. 3, the suspension processing circuit 15 transmits the count value "2" as the count value X to the CPU 20 when the suspension process starts. Then, the suspension processing circuit 15 masks the transmission of the tick interrupt signal from the first counter 11. Therefore, the subsequent tick interrupt signals are not transmitted to the CPU 20. In addition, the suspension processing circuit 15 causes the second counter 12 to count up. Since the second counter 12 is configured to count up in synchronization with the first counter 11, the second counter 12 actually starts to count up in synchronization with the next count value "1" from the first counter 11. Thereafter, the MCU 1 transitions to the low power mode.

Next, a timing of the return process to the normal mode will be described. For example, the MCU 1 starts the return process at a count value Z−1 of the second counter. Then, the return processing circuit 16 starts the return process when the count value Z of the second counter 12 is changed to the next count value (in the example of FIG. 3, the count value of the first counter 11 is "0"). More specifically, the return processing circuit 16 unmasks the tick interrupt signal when the count value of the first counter 11 is "0". Therefore, a period after the tick interrupt signal has been masked by the suspension processing circuit 15 until the next tick interrupt signal is unmasked by the return processing circuit 16 is part of the tick-less period. In addition, the return processing circuit 16 takes in the count value Z of the second counter 12 when the count value of the first counter 11 is "0", and transmits the count value Z to the CPU 20.

In the CPU 20, the RTOS calculates the elapsed time using the count values X and Z, and corrects the internal time by adding the elapsed time period. More specifically, the RTOS calculates the total counted number of the (masked) tick interrupt signals during the tick-less period, and corrects the internal time on this basis. The corrected counted number becomes ((3−X)+Z)/3 (decimal places can be discarded). Herein, "3" in the numerator and the denominator indicates the resolution of the first counter 11 and may be adjusted according to the resolution of the first counter 11. The RTOS corrects the internal time by adding the results of the corrected count number determination to the previously stored internal time value/count.

1.4 Effect According to this Embodiment

With the configuration according to this embodiment, it is possible to improve reliability. Hereinafter, this effect will be described.

As a method of reducing the power consumption in an MCU using the RTOS for the low power consumption, there is a method in which the power supply to some components (for example, the CPU) in the MCU is stopped when not being used by any task, so as to reduce the power consumption by transitioning to the low power mode. However, in a case where the RTOS itself is stopped by setting the CPU to the suspension state, for example, the updating of the internal time necessary for the RTOS will also be stopped. Therefore, the internal time deviates from the real time after the normal mode is returned, which may cause operational faults in communications or synchronization with the external device 100, for example.

For this reason, the RTOS sequentially performs the following three procedures in the suspension process when the semiconductor device transitions to the low power mode.
1. Stop the synchronization timer,
2. Mask the interrupt signal, and
3. Acquire the current time from a hardware function.

The hardware function is, for example, an RTC (real time counter) built in the MCU or a mechanism contained in the external device. In addition, the RTOS sequentially performs the following three procedures in the return process where the semiconductor device returns to the normal mode.

1. Acquire the current time from the hardware function,
2. Calculate an time elapsed while in the low power mode using the time (counts) acquired in the suspension process and the return process, and correct the internal time, and
3. Restart the synchronization timer.

In this case, the RTOS sequentially performs the respective procedures when controlling the suspension process or the return process. Therefore, for example, in a case where the tick interrupt signal occurs during a period from 1. Stop the synchronization timer to 3. Acquire the current time, or a period from 1. Acquire the current time to 3. Restart the synchronization timer in the suspension process, the RTOS cannot take in the tick interrupt signal. Accordingly, it fails to acquire the tick, and there may occur a deviation between the internal time and the real time.

However, in the configuration according to this present embodiment, there is provided the suspension processing circuit 15 for controlling the suspension process and the return processing circuit 16 for controlling the return process. Then, the suspension processing circuit 15 performs the acquisition of the count value in the first counter 11 (synchronization timer), the masking of the tick interrupt signal, and the restarting of the counting of the second counter 12 almost at the same time. In addition, the return processing circuit 16 performs the unmasking of the tick interrupt signal and the acquisition of the count value of the second counter 12 almost at the same time. Therefore, the acquisition fail of the tick in the suspension process and the return process can be suppressed, and a deviation between the internal time and the real time after returning to the normal mode can be suppressed. Accordingly, the time control in the RTOS can be improved in reliability. Further, it is possible to improve the reliability of the semiconductor device incorporating such timing control.

The power supply to the CPU and the memory can be stopped in the low power mode in the configuration according to this embodiment. Therefore, it is possible to reduce the power consumption of the semiconductor device by adopting this embodiment.

Furthermore, the power consumption can be reduced with this embodiment. For example, in a case where a fixed capacity power supply such as a battery is used, a life time of the power supply can be lengthened.

2. Second Embodiment

Next, a semiconductor device according to a second embodiment and a control method thereof will be described. The second embodiment is different from the first embodiment in that the return processing circuit 16 triggers the return process according to the count value of the second counter 12. Hereinafter, the description will be made about the difference from the first embodiment.

2.1 Configuration of Semiconductor Device

First, the configuration of the semiconductor device of the second embodiment will be described. The overall configuration is the same as that of FIG. 1 for the first embodiment. Hereinafter, the differences in circuit configuration from the first embodiment will be described.

The second counter 12 starts to count down from a predetermined counter value Z under the control of the suspension processing circuit 15. Then, the second counter 12 has, for example, a function of generating the interrupt signal to the CPU 20 when counting down to a predetermined count value (for example, the count "0"). More specifically, for example, when the count value of the second counter 12 overflows while in the low power mode, the internal time cannot then be accurately corrected. Therefore, when counting down to a predetermined count value, the second counter 12 transmits the interrupt signal to the return processing circuit 16, the CPU 20, or the power control unit 40. Then, the MCU 1 returns to the normal mode in response to this interrupt signal. Further, the description in this second embodiment has been made about an example in a case where the second counter 12 counts down, but this setting of the second counter 12 may be arbitrarily changed.

When receiving the interrupt signal from the second counter 12, the CPU 20 starts the return process. In addition, when receiving the interrupt signal from the second counter 12, the CPU 20 starts to transition to the low power mode again after updating the internal time.

2.2 Suspension Process and Return Process

A flow of the suspension process and the return process according to this second embodiment will be described.

Figure 4:
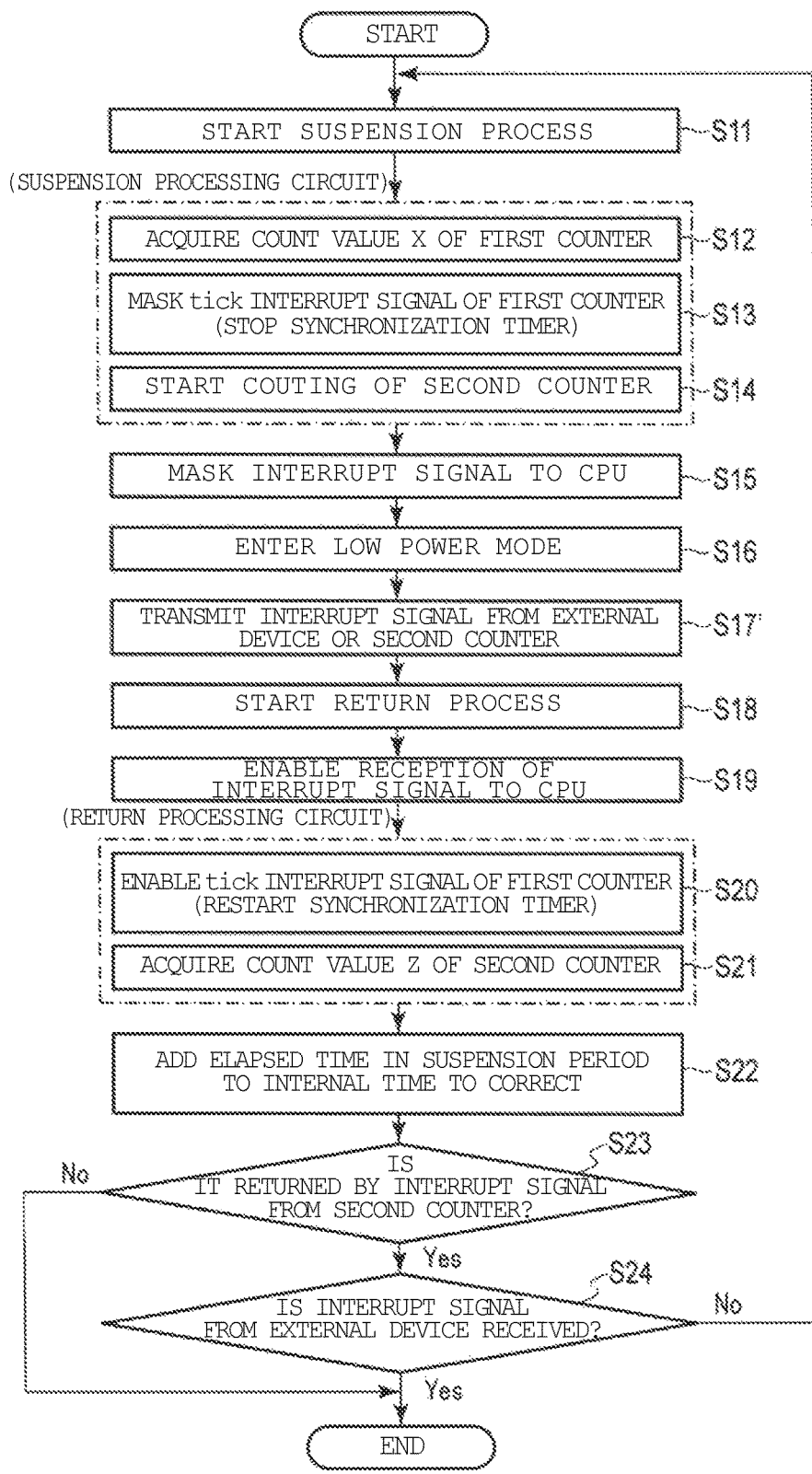
FIG. 4 is a flowchart of operations of a semiconductor device according to a second embodiment.

FIG. 4 is a flowchart of the semiconductor device according to this second embodiment.

As illustrated in FIG. 4, the process in Steps S11 to S16 is substantially the same as that of FIG. 2 of the first embodiment.

Next, when the interrupt signal is transmitted from the external device 100 or the second counter 12 to the power control unit 40 (Step S17'), the MCU 1 starts the return process from the low power mode to the normal mode (Step S18).

The return process in Steps S19 to S22 is substantially the same as that of FIG. 2.

Next, in a case where the CPU 20 returns to the normal mode due to the interrupt signal supplied from the external device 100 (Step S23_No), the RTOS restarts tasks/functions in response to the interrupt signal from the external device 100.

On the other hand, in a case where the CPU 20 returns to the normal mode due to the interrupt signal from the second counter 12 (Step S23_Yes), the RTOS confirms whether the interrupt signal has been received from the external device 100 or not.

Then, in a case where the interrupt signal has been received from the external device 100 (Step S24_Yes), the RTOS restarts normal operations in response to the interrupt signal from the external device 100.

In addition, in a case where the interrupt signal has not been received from the external device 100 (Step S24 No), the CPU 20 returns to the Step S11 and starts to transition to the low power mode again.

2.3 Correction of Internal Time

The correction of the internal time according to this second embodiment will be described.

Figure 5:
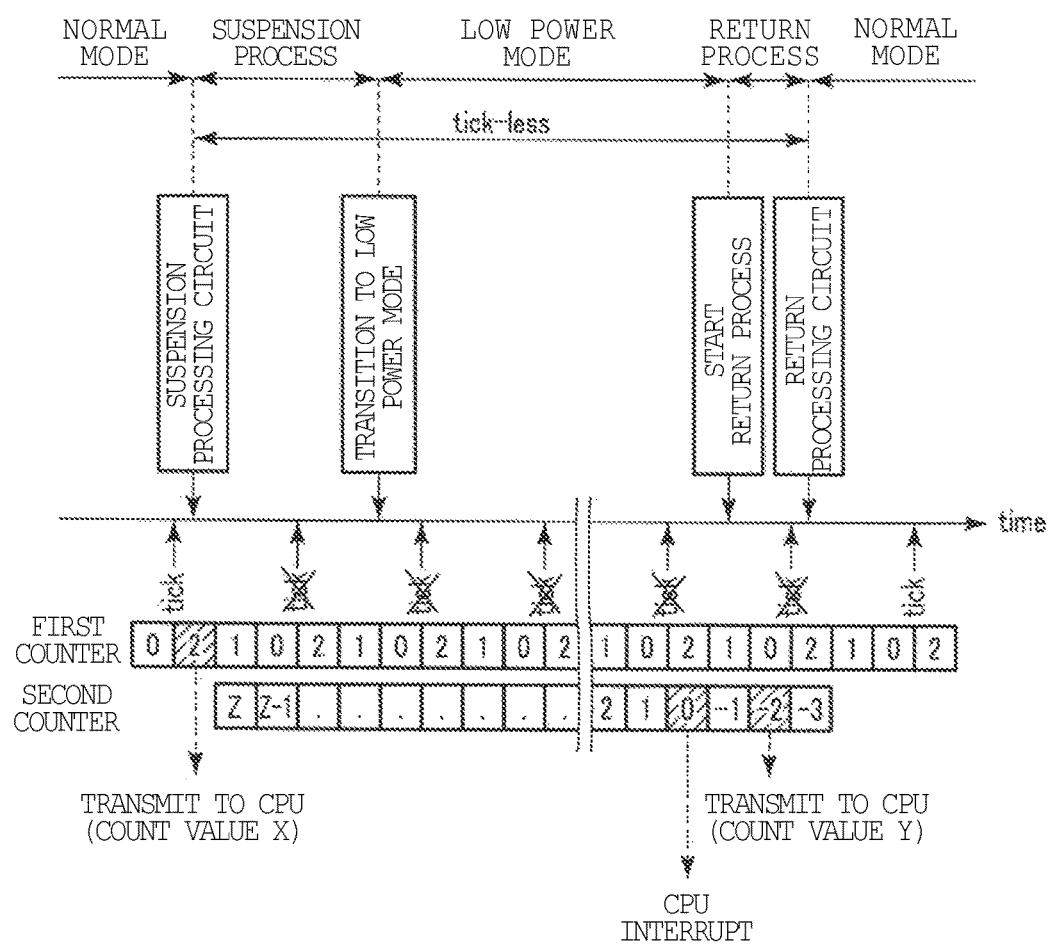
FIG. 5 is a timing chart of operations of the semiconductor device according to the second embodiment.

FIG. 5 is a timing chart of the semiconductor device according to this embodiment.

As illustrated in FIG. 5, the suspension processing circuit 15 transmits the count value "2" as the count value X to the CPU 20 when the suspension process starts. Then, the suspension processing circuit 15 masks the tick interrupt signal from the first counter 11.

In addition, the suspension processing circuit 15 causes the second counter 12 to count down. Since the second counter 12 counts down in synchronization with the first counter 11, the second counter 12 actually starts to count down in synchronization after the next count value "1" of the first counter 11. The count value of the second counter 12 at this time is set to Z. Thereafter, the MCU 1 transitions to the low power mode.

Next, a timing of the return process to the normal mode will be described. For example, when the count value becomes "0", the second counter 12 transmits the interrupt signal to the CPU 20 or the power control unit 40. Furthermore, the second counter 12 keeps counting even after the count value becomes "0" (counts represented in FIG. 5 by negative values).

The MCU 1 starts the return process in response to the interrupt signal of the second counter 12. Here, the return processing circuit 16 starts the process when the count value of the second counter 12 becomes "−3," for example. More specifically, the return processing circuit 16 takes in the count value "−2" of the second counter 12 when the count value become "−3" in the second counter 12, and transmits this count value to the CPU 20 as a count value Y.

The RTOS calculates an elapsed time based on the count values X, Y, and Z. The corrected count number becomes $((3-X)+(Z+1-Y))/3$. Herein, "3" in the numerator and the denominator indicates the resolution of the first counter 11 and may thus be adjusted in accordance with changes in the resolution of the first counter. The RTOS corrects the internal time by adding the results.

2.4 Effect According to this Second Embodiment

With the configuration according to this second embodiment, it is possible to obtain substantially the same effect as that of the first embodiment.

With the configuration according to this second embodiment, the semiconductor device periodically returns to the normal mode even while otherwise in the low power mode, and the internal time can be corrected/updated and the count value of the second counter 12 can be reset. Therefore, it is possible to prevent the count value in the second counter 12 from overflowing when the low power mode is for an extended time period. Accordingly, it is possible to limit correction errors in the internal time that might otherwise result due to the overflowing of the count value.

In this second embodiment, since the count value of the second counter 12 can be periodically reset, there is less need to increase a maximum value of the count number. Therefore, circuitry and/or storage associated with the second counter 12 can be minimized. Accordingly, a circuit area of the second counter can be made small, and a chip area of the semiconductor device can be suppressed from being increased.

Since the correction of the internal time and the resetting of the count value of the second counter 12 are periodically performed in this second embodiment, it is possible to suppress the correction error in the internal time even in a case where the low power mode continues for a long time.

3. Modifications

A semiconductor device according to the above embodiments includes a first operation mode (the normal mode) and a second operation mode (the low power mode) in which the power consumption is less than that in the first operation mode. The semiconductor device is provided with a CPU (20 in FIG. 1) on which the RTOS runs. The RTOS updates the internal time in the first operation mode and stops updating of the internal time in the second operation mode. The first counter (11 in FIG. 1) is provided that periodically repeats its counting (e.g., 0, 2, 1, 0, 2, 1, . . . ), and periodically transmits the timer interrupt signal (the tick interrupt signal) for updating the internal time to the CPU. The second counter (12 in FIG. 1) is provided which counts during the second operation mode. A first circuit (15 in FIG. 1) controls the reading of a first count value (X) from the first counter at a starting time of the transition from the first operation mode to the second operation mode, the masking of the timer interrupt signal from the first counter, and the starting of the counting in the second counter when the semiconductor device transitions from the first operation mode to the second operation mode (suspension process). A second circuit (16 in FIG. 1) controls the unmasking of the timer interrupt signal from the first counter, and the reading of a second count value (Z) of the second counter when the semiconductor device transitions from the second operation mode to the first operation mode (the return process).

According to the above embodiments, it is possible to provide the semiconductor device which can have improved reliability. Further, the present disclosure is not limited to the above-described aspects, and various changes can be made to the example embodiments.

For example, in the above example embodiments, the suspension processing circuit 15 and the return processing circuit 16 may be formed by one circuit having these functions in combination.

For example, in the above example embodiments, the time management unit 10 may be provided with three or more counters. For example, there may be provided a third counter. Then, the second counter may repeatedly count in a constant period (similar to the first counter, though not necessarily the same constant period as the first counter). The third counter may count a cycle number of the count value of the second counter. Therefore, the total number of counts (elapsed time) in the low power mode can be increased.

For example, the suspension processing circuit 15 may transmit a signal for masking the interrupt signal to the CPU 20. Similarly, the return processing circuit 16 may transmit a signal for unmasking the interrupt signal to the CPU 20.

For example, the above embodiments may be applied to any semiconductor device used for the management of the internal time of a device without being limited to a MCU.

Furthermore, the expression "connection" in the above embodiments includes also a state where the components are indirectly connected to each other through something else such as a transistor or a resistor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device having a first operation mode and a second operation mode in which power consumption is less than in the first operation mode, the device comprising:

a processor for running a real time operating system (RTOS), the RTOS causing the processor to update an internal time in the first operation mode and to stop updating the internal time in the second operation mode;

a first counter configured to repeat a periodic counting sequence and periodically transmit an interrupt signal to the processor, the interrupt signal being coordinated with the periodic counting sequence;

a second counter configured to count while the semiconductor device is in the second operation mode;

a first circuit configured to read a first count value from the first counter at a starting time of a transition from the first operation mode to the second operation mode, to mask the interrupt signal to the processor after the starting time of the transition from the first operation mode to the second operation mode, and to cause the second counter to start counting; and a second circuit configured to unmask the interrupt signal from the first counter after a starting time of a transition from the second operation mode to the first operation mode and to read a second count value counted by the second counter.

2. The semiconductor device according to claim 1, wherein the RTOS causes the processor to correct the internal time to account for a period of time in the second operation mode by using the first count value and the second count value.

3. The semiconductor device according to claim 1, wherein the first circuit is configured to start the reading of the first count value, the masking of the interrupt signal, and the counting of the second counter within one count increment of the first counter.

4. The semiconductor device according to claim 1, wherein the second circuit is further configured to start the unmasking of the interrupt signal and the reading of the second count value within one count increment of the first counter.

5. The semiconductor device according to claim 1, wherein, the second circuit is further configured to cause the transition from the second operation mode to the first operation mode when the second count value reaches a predetermined value.

6. The semiconductor device according to claim 5, wherein the second counter is configured to count down from an upper limit counter value and the predetermined value is zero.

7. The semiconductor device according to claim 1, wherein a resolution of the first counter is equal to a resolution of the second counter.

8. The semiconductor device according to claim 1, wherein a resolution of the first counter is different from a resolution of the second counter.

9. The semiconductor device according to claim 1, further comprising:
a real time counter outputting a clock signal to the first and second counters.

10. The semiconductor device according to claim 9, wherein the real time counter operates in accordance with an external crystal oscillator.

11. The semiconductor device according to claim 9, wherein the real time counter includes a non-crystal oscillator.

12. A method of controlling a semiconductor device having a first operation mode and a second operation mode in which power consumption is less than in the first operation mode, the method comprising:

reading, during a transition of the semiconductor device from the first operation mode to the second operation mode, a first count value from a first counter that is configured to repeat a periodic counting sequence;

masking an interrupt signal supplied by the first counter to a processor running a real-time operating system (RTOS), the interrupt signal being coordinated with the periodic counting sequence and used by the RTOS to update an internal time during the first operation mode, the masking continuing during the second operation mode;

triggering a second counter to start counting during the transition from the first operating mode to the second operating mode;

unmasking the interrupt signal during a transition from the second operation mode to the first operation mode;

reading a second count value counted by the second counter at a starting time of the transition from the second operation mode to the first operation mode; and calculating a correction for the internal time using the first count value and the second value so as to account for an elapsed time of the second operation mode.

13. The method according to claim 12, wherein:
the reading of the first count value is caused by a first circuit,
the masking of the interrupt signal is caused by the first circuit, and
the triggering of the second counter to start counting is caused by the first circuit.

14. The method according to claim 13, wherein the first circuit causes the reading of the first count value, the masking of the interrupt signal, and the triggering of the second counter to start counting within one count increment of the first counter.

15. The method according to claim 12, wherein:
the unmasking of the interrupt signal is caused by a second circuit, and
the reading of the second count value is caused by the second circuit.

16. The method according to claim 15, wherein the second circuit causes the unmasking of the interrupt signal and the reading of the second count value within one count increment of the first counter.

17. A time management unit, comprising:
a first counter configured to repeat a periodic counting sequence of first counter values, periodically transmit a timing signal to a processor executing a real-time operating system, the timing signal being coordinated with the periodic counting sequence, and output a starting point counter value in response to a first control signal;

a second counter configured to start counting in response to the first control signal and to output an elapsed time counter value in response to a second control signal;

a first circuit configured to output the first control signal and to cause a masking of the timing signal upon receipt of a first mode transition signal indicating the processor is to be switched from a high power consumption mode to a low power consumption mode; and a second circuit configured to output the second control signal and to cause an unmasking of the timing signal from the first counter upon receipt of a second mode transition signal indicating the processor is to be switched from the low power consumption mode to the high power consumption mode.

18. The time management unit according to claim 17, wherein an internal time of the real-time operating system is corrected to account for a total elapsed time in the low power consumption mode using the starting point counter value and the elapsed time counter value.

19. The time management circuit according to claim 17, wherein the second mode transition signal is issued when the second counter reaches a predetermined count value.

20. The time management circuit according to claim 17, wherein the first and second counters have a same resolution.

* * * * *